Oct. 14, 1941.    C. P. XENIS    2,259,053
LIMITER
Filed June 6, 1939    4 Sheets-Sheet 1
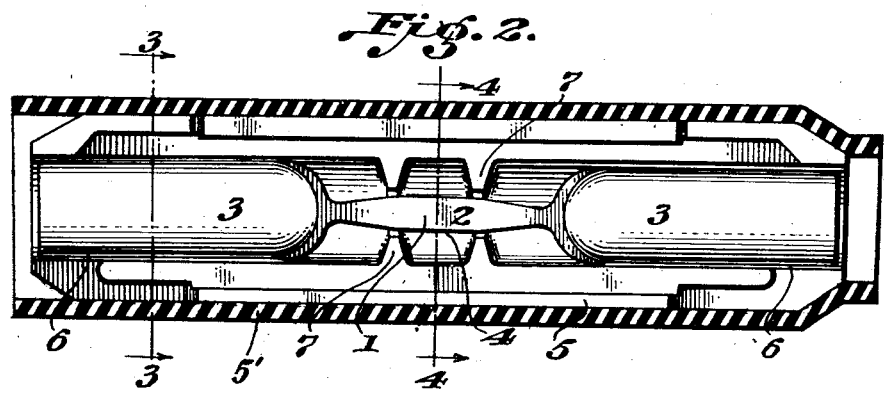
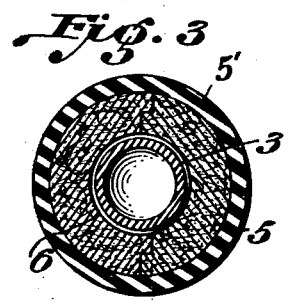
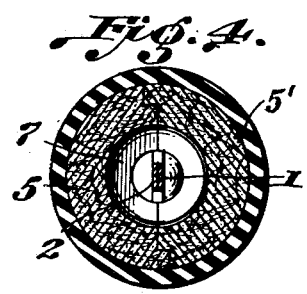
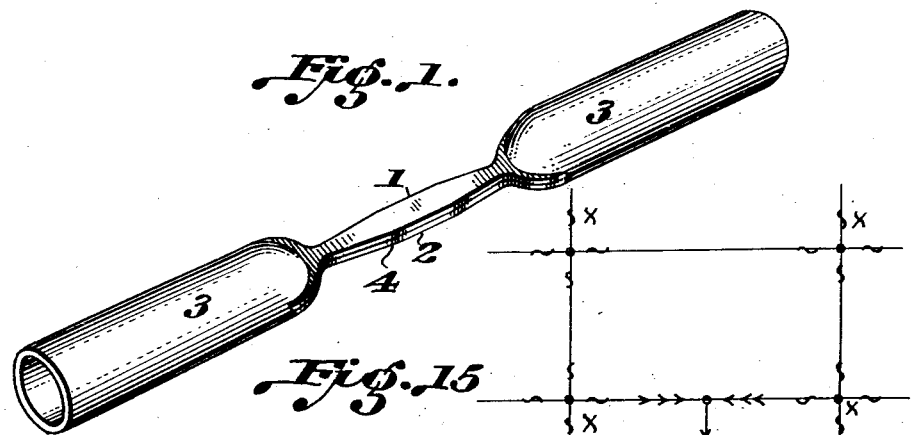
Inventor
Constantine P. Xenis
By
Atty.

Oct. 14, 1941.                C. P. XENIS                 2,259,053
                                LIMITER
                          Filed June 6, 1939           4 Sheets-Sheet 2
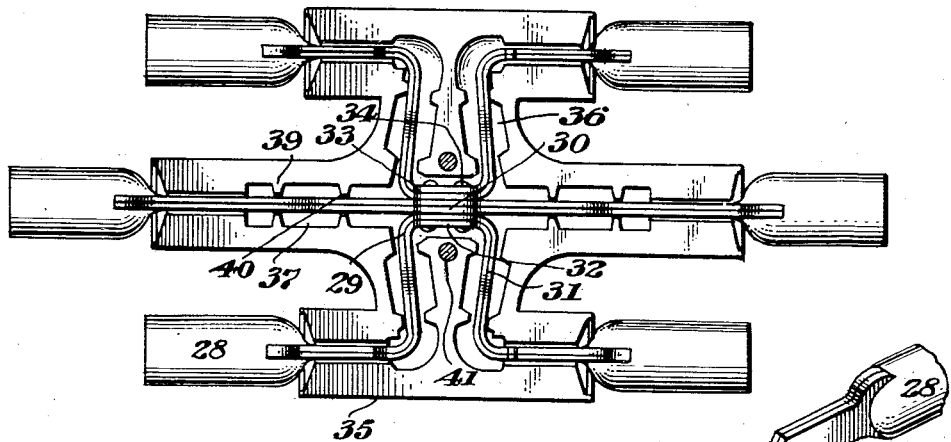
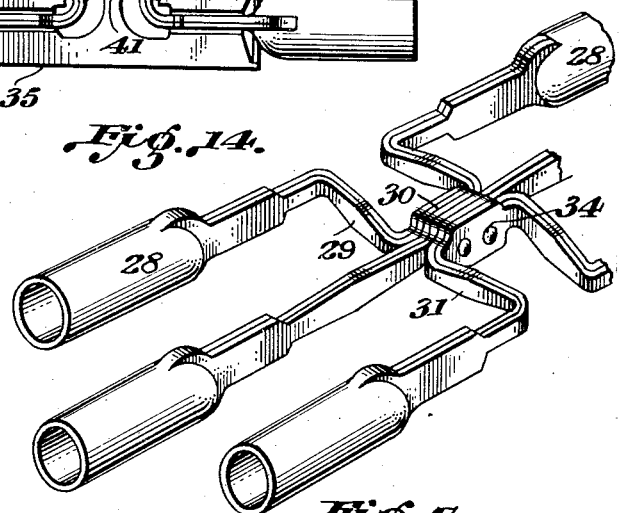
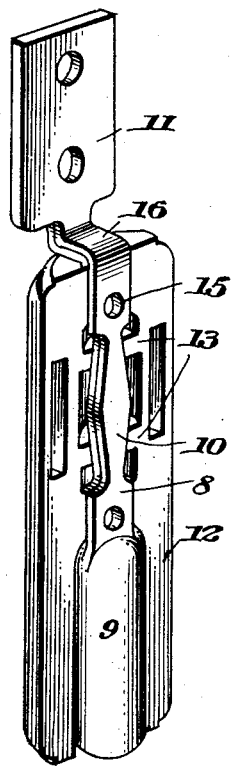
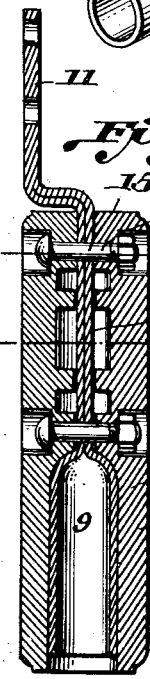
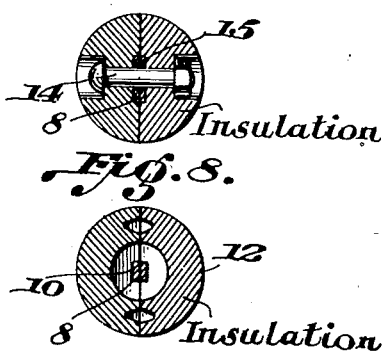
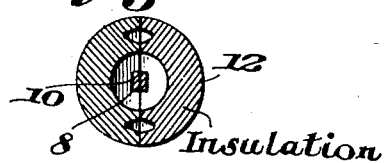
Inventor:
Constantine P. Xenis
By
        Atty.

Oct. 14, 1941.  C. P. XENIS  2,259,053
LIMITER
Filed June 6, 1939  4 Sheets-Sheet 3

Inventor:
Constantine P. Xenis
By ____ Atty.

Oct. 14, 1941.                C. P. XENIS                2,259,053
                                LIMITER
                          Filed June 6, 1939                4 Sheets-Sheet 4
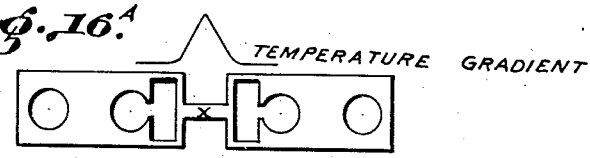
Fig. 16.A         TEMPERATURE GRADIENT
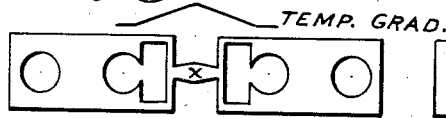     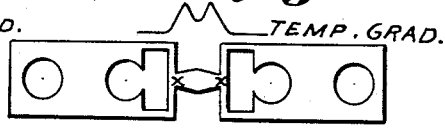
Fig. 16.B  TEMP. GRAD.       Fig. 16.C  TEMP. GRAD.
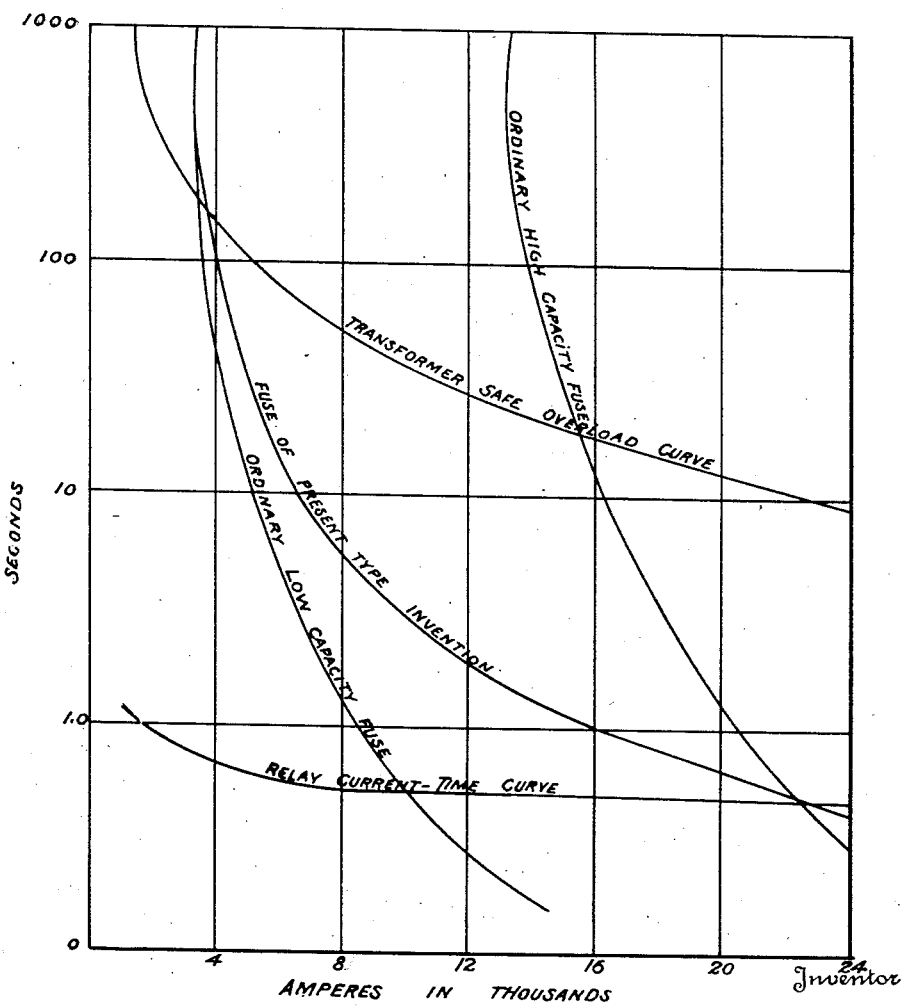
Fig. 17.
Inventor
Constantine P. Xenis
By [signature]
Attorney Patented Oct. 14, 1941

2,259,053

UNITED STATES PATENT OFFICE 2,259,053

LIMITER

Constantine P. Xenis, Little Neck, Long Island, N. Y.

Application June 6, 1939, Serial No. 277,741

8 Claims. (Cl. 200—133)

This invention is directed to an improvement in the connection and protection of cable installations designed particularly with a view to materially simplifying the installations of the distributing networks and avoiding the necessity of particular enclosures, terminal blocks, packing glands, and the like, heretofore necessary for the protection of the system.

A large percentage of secondary cable faults in distribution networks "burn clear" rapidly. In such cases, the short circuit current to the fault has not proceeded for a sufficiently long period of time to raise the temperature of the cable conductor on either side of the fault to a high enough temperature to fuse or permanently damage adjacent cable insulation. However, in a no inconsiderable number of such faults, there is a "spreading" beyond the initial point of fault to the extent of cable failure and to the obvious result of extensive damage to the cable structure, the extent of which is only controlled by more or less prompt repair.

The installation of a large number of enclosures in a street to house the necessary fuse links, bus bars, terminal blocks, packing glands, etc., required at street intersections and other multiple points of a network in order to provide fuse protection for the distribution system, is subject to a number of objections. For instance, the cost of these assemblies represents a major increase in distribution costs. The fusing assemblies on underground systems occupy space which is at a premium and frequently not available in important streets of large cities due to congestion resulting from the multitude of underground structures for transit subways, telephone, gas, steam, water and traffic control systems. Furthermore, where fusing systems of this type have been provided in the past the resulting cable protection has been of doubtful efficiency because of the lack of fuses having suitable operating characteristics for the protection of cables of the sizes and types used on energy distribution systems.

The development of non-combustible cable insulation provides one means of attack for the difficulty, but the essential means of attack with which the present invention is more particularly concerned is the provision of cable jointing connectors which incorporate fusible or protective elements so that in addition to their normal splicing functions they provide adequate fuse protection to the cables to which they are attached.

The primary object of the present invention is, therefore, the provision of a limiter or fuse, generally in the form of a reduced metallic section, incorporated in or forming an integral part of a connector, lug, crab joint or the like, employed in normal cable installation. This limiter has a time current characteristic so calculated as to protect the cable to which it is connected over a wide range of short circuiting currents to the end of interrupting the faulty circuit before the insulation on cables supplying the short circuit current to the point of fault reaches the point of destruction.

Obviously, the combination of the connector and limiter as an essential feature in cable installation is contemplated as being made up in numerous forms with a view to accommodating most if not all of the necessary network connections. Incidental to this essential part of the invention certain forms of connectors have also been devised which may advantageously be used either with or without the fusible sections incorporated therein and insofar as these connectors are novel they are a part of this invention.

The invention is illustrated in the accompanying drawings, in which:

Figure 1 is a perspective view of a simple type of cable connector formed integrally with the improved limiter or fuse.

Figure 2 is a longitudinal plan view showing the connector and limiter resting in one of the halves of its fire-proofing shell.

Figure 3 is a section on the line 3—3 of Figure 2 but showing both halves of the fire-proofing shell in place.

Figure 4 is a section on the line 4—4 of Figure 2, also showing both halves of the fire-proofing shell in place.

Figure 5 is a perspective view of a modified form of connector and limiter used more particularly in vault construction. One half of the fire-proofing shell has been removed to more clearly show the construction.

Figure 6 is a sectional view, partly in elevation, showing the same fully enclosed in the protective shell.

Figure 7 is a section on the line 7—7 of Figure 6.

Figure 8 is a section on the line 8—8 of Figure 6.

Figure 13 is a side sectional view of a further form of connector and limiter, the fire-proofing covering being illustrated.

Figure 14 is a broken perspective of the connector and limiter shown in Figure 13.

Figure 15 is a diagram showing the application of the limiters in a network system.

Figure 9:
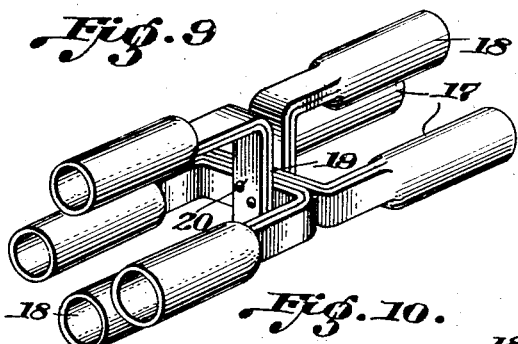
Figure 9 is a perspective view of a further modification showing a plural cable connector without integral limiter or fuse sections, but into which such limiters or fuses can be built.

Figures 16a, b and c are plan views of limiter or fuse constructions, each with a curve indicating the temperature gradient in the limiter under conditions of overload.

Figure 17 is a chart showing the operations of the limiters of this invention as compared with that of an ordinary fuse.

In the form shown in Figures 1 to 4 inclusive, a simple type of connector and limiter is made from a single piece of copper tube of appropriate diameter, the central portion 1 of which is flattened and the excess metal punched out to leave the limiter section 2 and the cable receiving end sections 3, which are of the normal diameter of the tube selected.

The design of the limiter so that it will have the proper time-current characteristics at various overloads has proven to be quite difficult but a design has ultimately been reached that provides the desired characteristics so that the limiter will fuse only when it is desired that it should. In distribution systems there occur from time to time accidental short circuits that burn themselves out in a very short time, overloads that will normally trip relays or circuit breakers in the system and thus stop themselves and other conditions that for very temporary periods cause excess current to pass through the network. The desired form of current limiter will not fuse under such conditions but will fuse under a continued relatively small over-load and will fuse under a continued high over-load sufficiently soon to protect the insulation on the cables, transformers and the like of the system. In order to perform this function properly it is necessary that the fuse blow at a current slightly over its rated capacity on prolonged exposure to such current but that it provide some time delay before it blows even at quite high currents.

It has long been the custom to use fuses that consist either of a length of fuse material of uniform cross-section or of a fuse material of non-uniform cross-section having one or more areas of small cross-section at which the fuse blows. While either of these types of fuses may be made to blow at any desired current and the fuse having the constricted areas may be caused to have a desired amount of delay at currents slightly in excess of the current at which it is desired that it blow by causing the heat to radiate from the restricted sections to the larger sections adjacent them, neither of these types of fuse will have the desired delay in action under higher loads. In the usual fuse the restricted sections are of very small area and hence are quickly heated by high current despite the radiation possibilities, and the fuse fails very quickly. With a fuse of uniform cross-section the heat is radiated from the ends of the fuse to its support, but at the center of the fuse is not able to lose its heat so rapidly and fuses relatively quickly at that point.

According to the present invention it has been discovered that a fuse may be brought more nearly into a state of balance insofar as heat generated and heat radiated is concerned and that by this process of balancing, a fuse may be formed which will be heated relatively uniformly by the passage of a high current, until it finally fuses, preferably at the center, but only after substantially the whole fuse is heated nearly to the melting point. Such a fuse may be of elongated, almost uniform cross-section, but slightly thicker in the central portion, this slight thickening tending to compensate for the radiation of heat from the ends of the fuse so that although more heat is radiated from the ends of the fuse, more is generated there by reason of its smaller cross-section near the ends and the amount of heat generated in the central portion is just sufficient so that the temperature of the central portion of the fuse will rise slightly ahead of the temperature of the end portion. Thus the central portion of the fuse eventually melts but only after the whole fuse has been heated almost to the melting point, thus interposing a considerable time delay in the action of the fuse.

To illustrate the action of such a fuse, reference may be had to Figures 16a, b and c, of the drawings. In Figure 16a a fuse is shown which has a uniform cross-section and above the fuse is shown a curve representing the temperature gradient of the fuse as a high current is applied thereto. It will be noted that the temperature rises much more rapidly at the center of the fuse than at the ends and the fuse will eventually melt after a very short interval at the character X. In Figure 16b a fuse according to the present invention is shown and in this fuse the center portion X has been enlarged sufficiently to partially overcome the tendency of the temperature in the central portion of the fuse to rise faster than the temperature in the end portions. As a consequence, a greater amount of heat must be generated to heat the widened middle portion of the fuse and bring it to melting temperature and supply the heat of fusion than if the fuse were of uniform width or reduced width in the middle. This results in considerably delaying the fusing action. In Figure 16C the correction of the fuse has been carried too far and thus fusing will take place at points where the width is not a maximum, and, therefore, the benefit of delayed action at high currents is lost. It has been found desirable, according to this invention, to construct fuses that will have a temperature gradient approximately as shown in Figure 16B and avoid over-compensation, illustrated in Figure 16C, throughout the useful operating range of the fuse.

In order to show the action of a fuse of this type Figure 17 shows the action of a relay in a circuit and the safe overload for a transformer in the same circuit, both plotted on a time current diagram and in combination with these a curve showing the characteristics of the new fuse. As can readily be seen, it would take a very high current to melt the fuse before the relay would take effect. However, if the relay for some reason becomes inoperative, then the fuse will protect the transformer from all except a very minor over-load. The action of ordinary fuses of two different ratings in such a circuit is also shown on the diagram and from this it can be seen that while the low capacity fuse will protect the transformer in much the same way it will be subject to fusion before the relay can act if the current goes above 10,000 amperes. Obviously in any circuit where as high a load as 10,000 amperes is to be expected, such a fuse will be unsatisfactory. With the high capacity fuse the relay will have an opportunity to operate before the fuse fails but if the relay fails to operate the transformer will not be protected from overloads below 16,000 amperes and hence is in serious danger.

It is important from a protective standpoint that workmen and others be protected against dangerous adjuncts incident to the blowing of the fuse, and to this end, the combined connector and limiter, shown in Figure 1, is enclosed within a protective enclosure 5 of elongated tubular form, preferably smooth on the outer surface and formed within with intermediate channels 6, which receive the connector ends 3 and transverse abutments 7 to receive the limiter and more or less confine the same within a relatively narrow area. This protector 5 is preferably molded from a non-combustible dry mixture of asbestos and cement and the abutments or barriers 7 obviously confine the arc and tend to prevent it from striking across the larger portions of the limiter.

The connector construction is readily modified into the form of a limiter lug designed for indoor installation and for connecting the end of a cable to a panel board or the like. This form is illustrated particularly in Figures 5, 6, 7 and 8, and includes a connector, indicated generally at 8, formed at one end with a cylindrical member 9, in which a cable end is secured, with an intermediate limiter or fuse member 10 similar to that shown in Figure 1 and with a terminal lug 11 to provide for securing the connector in place in the installation.

In this form, the connector as a whole, except for the lug 11, is enclosed in a protective insulating covering 12, having abutments 13 around the blowing area of the fuse and secured by bolts 14 which pass through the respective sections of the protective covering 12 and through openings 15 in the connector. The protective covering is thus readily applied and has the additional function of holding a connector together after it has fused into two separate parts, thus avoiding possible change in position or separation. The bolts 14 are preferably countersunk in the protective covering and the connector may, adjacent the lug 11, be bent laterally, as at 16, to permit the same to be applied flat to the board or other supporting element.

The new protector or limiter may readily be incorporated in a more complicated form of connector such as a "crab" joint for multiple cable connection. One form of multiple cable connector is shown in Figure 9, wherein several connectors, indicated generally at 17, are provided in identical form or substantially identical form and are all connected at their mid-portions by rivets or the like 20. Each connector has a connecting strap 19 and cable receiving ends 18. A limiter or fuse may be incorporated as a part of the connecting strap but it is not shown. The new connector has many advantages aside from the incorporation of the fuse or limiter, however, and for that reason, is itself a part of this invention regardless of whether or not a fuse or fuses are incorporated as a part thereof.

Figure 10:
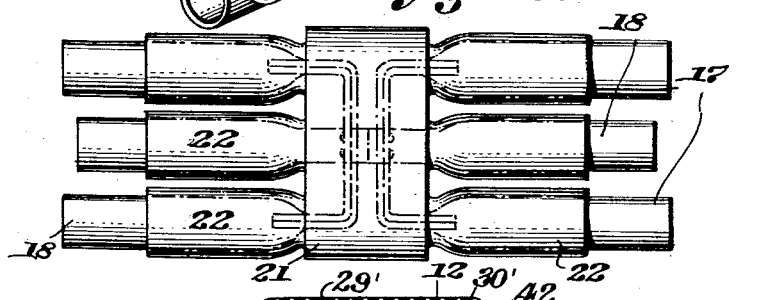
Figure 10 is a side view of the device of Figure 9, showing the connector of Figure 9 with an insulating covering.

When fuses or limiters are to be incorporated in such a connector, it will usually be enclosed as is the connector of Figures 1 to 4, by an arc-proof protective covering of some such material as asbestos and cement with arc chambers formed by baffles as annular partition therein to confine the arc that occurs upon the blowing of any fuse section to that particular area. Obviously, the rubber covering shown in Figure 10 cannot be used in such a position that it will be contacted by an arc or even the heated fusible sections, which reach temperatures of around 1000° C. for the rubber would be completely destroyed at around 300° C. A rubber covering can, however, and preferably should be placed around the arc-proof enclosure, not only to completely insulate the connection but also to hold the enclosing members in place and provide some elasticity so that the enclosure parts may move slightly to take up the shock of the sudden generation of pressure due to the arc. Such a rubber cover may be formed by applying preferably a rubber sleeve over the arc-proof enclosure. It will be found advantageous to do this with the connector of Figures 1 to 4 as well such, for example, as shown at 5' in Figure 2. The slight overlapping of the edges of the arc proofing enclosure parts prevents the arc from reaching the rubber even though the parts separate slightly under the pressure resulting from the arc.

As arranged in the form shown in Figure 9, the four connectors are disposed in two aligned pairs with each pair at right angles to the other and their connecting sections crossing each other at right angles and being secured by rivets or bolts 20. The form of "crab" joint shown in Figure 9 is completely insulated by a rubber or like coating or covering 21, which completely envelops each and every part of the respective connectors and extends as circular shields 22 lengthwise the tubular sections 18 to insure protective insulation for the unit. Of course, it is understood that after application of the cables, they are properly tapered in place to cover the remaining lengths, if any, of the tubular sections 18 of the joint.

In Figures 13 and 14, there is shown a form of "crab" joint in which the connectors are generally of the type shown in Figure 1, involving terminal connector sockets 28 and a reduced limiter or fuse section 29, connecting the sockets 28. Each pair of connector sockets located on the same axis with two intervening reduced sections and enlarged portion at the center 30 are made integrally from one piece of tubing flattened in the central portion and with the excess metal punched out as indicated. The three pieces thus formed are inter-connected at 30 forming an assembly indicated at 33, Figure 13, consisting of six terminal connector sockets, each socket having an adjacent reduced copper section. The central unit extends in a straight line through the joint, while side connectors 31 have their intermediate fuse sections bent into U form so that the widened cross bar of the U indicated at 32 bears against the corresponding widened portions of the other two units. The widened portion of the central connector 30 and of the side connectors 31, make available ample surface areas for brazing and the application of securing rivets 34 to maintain the parts in rigid connection with suitable electrical conductivity.

In this type of "crab" joint, all connectors are in the same horizontal plane or vertical plane, according to the disposition of the joint, and an enclosing molded casing 35 is provided which encloses all parts of the joint up to but not including the cable receiving sockets 28. This molded enclosure, which is intended to protect the system and the workmen against injury from the blowing of any fuse, is interiorly formed with channels 36 to receive the fuse connections of the side connectors 28 and channels 37 to receive the fuse connections of the central connector. In each of these channels are abutments 39 and 40, which confine the blowout area of the fuse section. The protective casing 35 is of course made in formed halves assembled to enclose the metal parts described and secured through the medium of bolts 41 joining the halves.

It should be realized that the protective enclosure 35 is made from material that is not particularly designed as electrical insulation, such as cement, asbestos, or the like, therefore, the joint is completely and properly insulated over the protective enclosure by a rubber or like coating or covering which completely envelops each and every part of the unit to insure adequate electrical insulation of the unit. The connector sockets are not covered with this rubber-like insulation. Of course, it is understood that after application of the cables, they are properly taped to cover the remaining length of the tubular sections 28 of the joint.

Figure 11:
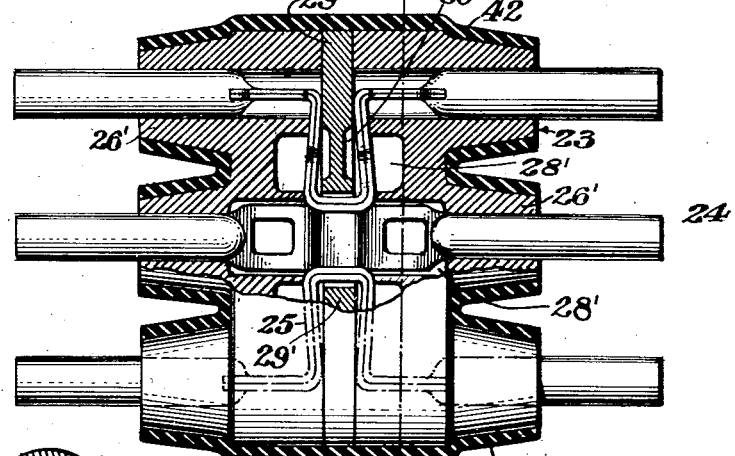
Figure 11 is a side view partially in section of a still different form of multi-cable connector in which limiters or fuses are incorporated.
Figure 12:
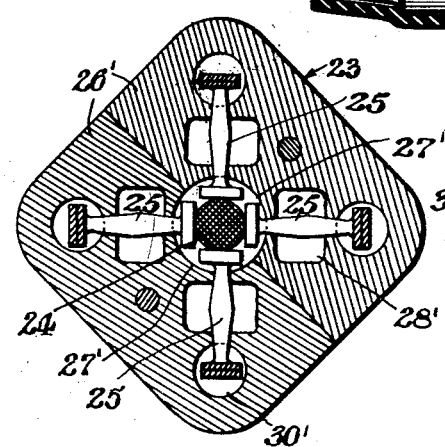
Figure 12 is a sectional end view of the device shown in Figure 11 taken along lines 12—12.

In the form shown in Figures 11 and 12, connectors of the form shown in Figure 1, indicated generally at 23, are disposed with relation to the main cable 24, so that their fuse sections 25 are secured by an appropriate connection directly to the central cable 24. The connectors thus are disposed in concentric spaced relation with the main conducting cable and provide for the connection of auxiliary cables therewith. In order to provide protection against blowout of fuses in this assembly the crab joint of this form is provided with what may be termed a base protective unit of rigid non-conductive material made up in two similar sections 26', formed with a central opening 27' to fit around the central lead and the connected portions of the fuse sections and extend between the U-shaped portions of the fuse sections outward to a point beyond the plane of the dual connector sections. This relatively narrow section 26' is formed within the blow area of the fuse sections of the connectors with depressions 28'. End sections 29' are then formed to overlie the surface of the intermediate section 26'.

These end sections are formed, of course, to accommodate the fuse portions of the dual connectors and are further formed in line with depressions 28' and enlarged depressions 30', which with the depressions 28' form blow areas for the fuse sections. The crap joint thus provided is covered with appropriate rubber or like insulation 42, which in the sectional view in Figure 11, is shown to completely insulate the crab joint over the asbestos and cement enclosures. The rubber insulation does not cover the terminals of the tubular sockets, and does not come in contact at any point with the reduced copper sections that form the fusible part.

In Figure 15, there is shown sufficient of the network to illustrate the application of the fuses, such for example as shown in Figure 1 to the various lines of the network. It will be noted that the network lines are protected adjacent their connection with other lines by the installation of fuse or limiters indicated at X, and this use of liimiters at such multiple points results in the protection of each cable section between such points. If fusible crab joints of the types illustrated in Figure 13 and Figure 11 are used at these points, the interconnection as well as protection of the network lines at these points is accomplished. To illustrate how cable sections are protected, the indicated fault in Figure 15 is taken care of by the limiters in that line which carry the total fault current and thus protect the other lines of the network. Thus, by installing limiters of the same type at each multiple point of the network system, the selection between limiters is automatically secured and since the faulty section is equipped with limiters at both ends, it will be isolated from the rest of the network. The limiter of course is designed so that it will blow at the minimum values of short circuit current in the network.

What is claimed to be new is:

1. A limiter including an integral element having cylindrical cable receiving terminals, and an intermediate section of relatively reduced width adjacent each of the terminals and of relatively increased width intermediate the portions of reduced width.

2. A limiter comprising an integral element having cylindrical cable receiving terminals, and an intermediate flattened portion of relatively decreased width adjacent the terminals and of relatively increased width intermediate the portions of decreased width.

3. A limiter comprising an integral element having cable terminals shaped to surround and intimately engage cable ends, and a section intermediate the terminals formed adjacent each of said terminals with a portion of relatively narrow width and formed intermediate the portions of narrow width with a portion of relatively increased width.

4. A limiter comprising an integral element formed to encompass and intimately engage cable ends and a section forming continuations of the terminals, with such section having a portion adjacent each of the terminals of relatively narrow width and a portion of greater width intermediate such narrow width portions.

5. A limiter including an integral section having cylindrical cable receiving terminals, and an intermediate section of relatively reduced width adjacent the terminals and of relatively increased width intermediate the portions of reduced width, and a protective housing for the limiter having an internal bore corresponding approximately to the external diameter of the terminals, the housing being provided within the bore with annular spaced partitions which approximately embrace substantially the section of increased width of the intermediate section of the limiter.

6. A limiter including an integral section having cylindrical cable receiving terminals, and an intermediate section of relatively reduced width adjacent each of the terminals and of relatively increased width intermediate the portions of reduced width, and a protective housing for the limiter having an internal bore at least sufficient to receive the intermediate section of the limiter, the housing within the bore being provided with annular spaced partitions which embrace substantially the section of increased width of the intermediate section of the limiter.

7. A limiter including an integral section having cable receiving terminals, an intermediate section of relatively reduced width adjacent each of the terminals and of relatively increased width intermediate the portions of reduced width, a heat resisting housing formed with an internal bore corresponding to the external diameter of the terminals, said housing being divided longitudinally into sections for convenient application and having a length at least equal to that of the intermediate section of the limiter, the internal wall of the housing having spaced inwardly extending partitions disposed respectively adjacent the ends of the portion of increased width of the intermediate section, the abutments defining an annular channel surrounding the portion of increased width and dividing such annular channel from the remaining length of the bore of the housing.

8. A limiter including an integral section having cable receiving terminals, and an intermediate section of relatively reduced width adjacent each of the terminals and of relatively increased width intermediate the portions of reduced width, a heat resisting housing having an internal bore at least sufficient to receive the intermediate section of the limiter, the housing within the bore having annular spaced partitions which approximately embrace substantially the section of increased width of the intermediate section of the limiter, and a protective envelope of insulating material enclosing the housing.

CONSTANTINE P. XENIS.